United States Patent
Matthijsse (10) Patent No.: US 7,483,611 B2
(45) Date of Patent: Jan. 27, 2009

(54) TRANSMISSION FIBRE WITH OPTICAL AMPLIFICATION AND METHOD FOR PRODUCING SAME

(75) Inventor: Pieter Matthijsse, Hapert (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/340,722

(22) Filed: Jan. 27, 2006

(65) Prior Publication Data

US 2006/0204191 A1     Sep. 14, 2006

(51) Int. Cl.
G02B 6/02 (2006.01)
H04B 10/12 (2006.01)
H01S 3/00 (2006.01)
H01S 3/30 (2006.01)

(52) U.S. Cl. ............ 385/123; 372/6; 359/341.1; 359/341.5

(58) Field of Classification Search ......... 385/123–128; 359/337, 337.3, 341.3–341.5; 372/6
See application file for complete search history.

(56) References Cited

U.S. PATENT DOCUMENTS

| | | | |
|---|---|---|---|
| 4,620,861 A | 11/1986 | Berkey | |
| 5,937,134 A * | 8/1999 | DiGiovanni | 385/142 |
| 6,009,221 A * | 12/1999 | Tsuda | 385/123 |
| 6,467,313 B1 | 10/2002 | Chu et al. | |
| 6,831,938 B1 * | 12/2004 | Gunn, III | 372/92 |
| 6,856,739 B2 * | 2/2005 | Zhang et al. | 385/123 |
| 2002/0151425 A1 | 10/2002 | Fujinoki et al. | |
| 2003/0142937 A1 * | 7/2003 | Collier et al. | 385/123 |
| 2003/0147619 A1 | 8/2003 | Anderson et al. | |
| 2004/0071418 A1 | 4/2004 | Seo et al. | |

OTHER PUBLICATIONS

Propagation Characteristics of Single-Mode Optical Fibers With Arbitrary Complex Index Profiles; Xin Qian, et al., IEEE Journal of Quantum Electronics, XP-001214157.
Raman-gain estimates for high-gain optical fibers; M.E. Lines; XP-002352710.

(Continued)

Primary Examiner—Kevin S Wood
Assistant Examiner—John M Bedtelyon
(74) Attorney, Agent, or Firm—Sughrue Mion, PLLC (57) ABSTRACT

A transmission fibre with optical amplification, comprising a core and a cladding. The core material is doped with a first dopant of a material having a higher index of refraction than the material of the cladding and with a second dopant of a material that converts pump energy in the form of light having a first wavelength into light having a second wavelength. The concentration of the second dopant within the core increases in radial direction in proportion to the distance to the centre of the core. The core material is preferably doped with a third dopant for compensating the variation in the refractive index caused by the second dopant. The cladding may comprise a cladding layer surrounding the core provided with a fourth and a fifth dopant for signal amplification and refractive index compensation, respectively, in the cladding layer. The dopants have been selected to enable amplification, using the Raman effect or stimulated emission.

43 Claims, 2 Drawing Sheets

OTHER PUBLICATIONS

Raman Amplifiers for Telecommunications; Islam; IEEE Journal of Selected Topics in Quantum Electronics, XP-002352709.

A Method to Predict the Raman Gain Spectra of Germanosilicate Fibers With Arbitrary Index Profiles; Bromage, et al.; IEEE Photonics Technology Letters, vol. 14, No. 1, Jan. 2002; XP-002323727.

Advances in Raman Fibers; Dianov; Journal of Lightwave Technology, vol. 20, No. 8, Aug. 2002.

10-W Raman Fiber Lasers at 1248 nm Using Phosphosilicate Fibers; Ziong, et al.; Journal of Lighwave Technology, vol. 21, No. 10, Oct. 2003.

* cited by examiner

TRANSMISSION FIBRE WITH OPTICAL AMPLIFICATION AND METHOD FOR PRODUCING SAME

FIELD OF THE INVENTION

The present invention relates to optical transmission, optical transmission fibres and, more particularly, to a transmission fibre with optical amplification.

BACKGROUND OF THE INVENTION

Optical transmission fibres with optical amplification, comprising a core and a cladding, wherein the core material is doped with a first dopant of a material having a higher index of refraction than the material of the cladding and with a second dopant of a material that converts pump energy in the form of light having a first wavelength into light having a second wavelength different from the first wavelength for amplifying an optical signal beam to be transmitted by the transmission fibre, are known from US patent publication U.S. Pat. No. 6,467,313.

The core material of the known transmission fibres contains a third dopant besides the first and the second dopant. These dopants are all individually and uniformly distributed over the core material. The third dopant has been added for the purpose of limiting the variation in the amplification characteristics of the transmission fibre in the wavelength range between 1525 and 1575 nm.

The technical developments and future requirements in the field of optical telecommunication must be taken into serious account when planning and constructing new optical fibre networks. New optical fibre connections must be suitable for future use in several wavelength ranges so as to enable the use of wavelength multiplex systems and higher transmission rates. As a result, the requirements to be made as regards the attenuation, the sensitivity to nonlinear behaviour and the dispersion are much more stringent than the requirements that suffice for meeting the short-term transmission needs.

To meet the long-term needs, requirements are made not only as regards the passive performance of transmission fibres in transmitting signal beams but also as regards the performance of transmission fibres for possible amplification of the optical signal beam by the fibre itself.

Optical amplification of signal beams in optical fibres can be effected inter alia by means of the so-called Raman effect, or by means of stimulated emission.

When the Raman effect is used, energy in the form of an optical pump signal having a wavelength different from the wavelength of the signal beam is supplied to the core of an optical fibre together with the signal beam that is to be amplified. By selecting the wavelength of the pump signal so that the wavelength that is shifted relative to the wavelength of the pump signal, at which the amplification to be generated by the Raman effect reaches its peak value, coincides with the wavelength of the signal beam to be amplified, signal beams having a wavelength range of about 20-30 nm can be amplified. By using several pump signals having suitably selected wavelengths in relation to each other, signal beams having a wavelength within a large wavelength range can be amplified in this manner.

Raman amplification is used, inter alia, in optical amplifiers in which an amplification fibre arranged for optical amplification is used. Such an amplification fibre is wound on a small coil, which forms one unit together with the components used for coupling light into and out of the fibre and a pump laser. Such amplifiers are used in communication systems as power amplifiers for the transmitter, as pre-amplifiers for the receiver and as repeaters in long connections, such as transoceanic connections.

The Raman effect can be applied by means of a pump signal in the direction of the optical signal beam to be transported ("co-directional pumping") as well as in the opposite direction ("contra-directional pumping").

In another application of the Raman effect, a signal beam is amplified by transmitting a pump signal from the transmitter in the direction of the receiver and a pump signal from the receiver in the direction of the transmitter, both of which pump signals are supplied to the core of the transmission fibre so as to amplify the signal beam distributed over the length of the transmission fibre therein.

The extent to which the Raman amplification is generated in an optical fibre is expressed by the Raman amplification factor. This factor depends on the material properties and on the profile of the index of refraction of the core, which determines the power distribution in a direction transversely to the direction of propagation both of the signal beam and of the pump signal. For a standard single mode fibre the Raman amplification factor is about $0.3\ W^{-1}\cdot km^{-1}$, for shifted dispersion fibres it is about $0.8\ W^{-1}\cdot km^{-1}$.

When stimulated emission is used, a pump signal in the form of light is supplied to the core of an optical fibre together with the signal beam to be amplified. The core material is doped with a material having an energy level wherein the electron population is inverted relative to a lower energy level by the pump signal so as to provide an emission of light to be stimulated by the signal beam for amplifying the signal beam.

Optical amplifier fibres are used for amplification through stimulated emission, wherein the core material contains a high concentration of the dopant that is active in the conversion of the light of the pump signal. Since standard transmission fibres as such are not arranged for amplifying a signal beam through stimulated emission, and consequently the core material of these transmission fibres is not doped with a material that is active in the conversion of the light of the pump energy and the related amplification of the signal beam, hardly any amplification resulting from stimulated emission is observed in standard transmission fibres.

On the other hand, amplification fibres are not suitable for use as transmission fibres for transmitting signal beams without the presence of pump signals, because the high concentration of the dopant in the core material of these optical fibres that is active in the conversion of light of the pump signal and the related amplification goes hand in hand with a high absorption of the light of the signal beam and a concomitant strong attenuation of the signal beam.

SUMMARY OF THE INVENTION

The object of the invention is to provide transmission fibres with optical amplification.

In order to accomplish that object, the invention provides a transmission fibre with optical amplification, comprising a core and a cladding, wherein the core material is doped with a first dopant of a material having a higher index of refraction than the material of the cladding and with a second dopant of a material that converts pump energy in the form of light having a first wavelength into light having a second wavelength different from the first wavelength for amplifying an optical signal beam to be transmitted by the transmission fibre, wherein the concentration of the second dopant within the core increases in radial direction in proportion to the distance to the centre of the core.

Providing the second dopant of the core material in such a manner that the concentration of this dopant near the centre of the core is lower than in parts of the core spaced from the centre of the core achieves that, in conditions in which no pump signal is supplied, the attenuation of the signal beam is for the greater part determined by the part of the signal beam that propagates in a region around the longitudinal axis through the centre of the core. As a result of the lower concentration of the second dopant around the axis of the core, the major part of the signal beam undergoes a relatively minor attenuation. This in contrast to the remaining, smaller part of the signal beam, which propagates in parts spaced from the centre of the core, in which the attenuation is higher than in the region near the centre of the core on account of the higher concentration of the second dopant.

In conditions in which a pump signal is supplied to the signal beam, the amplification of the signal beam is stimulated from the parts of the transmission fibre spaced from the centre, because light from the pump signal is converted with a higher degree of efficiency as a result of the higher concentration of the second dopant in comparison with the degree of efficiency that can be obtained with the concentration of the second dopant near the centre of the core.

In an embodiment of the invention, the concentration of the second dopant within the core is uniform in tangential direction.

In a preferred embodiment of the transmission fibre according to the invention, the core material is doped with a third dopant, wherein the material of the third dopant and the variation in the concentration of the third dopant within the core have been selected so that the variation in the refractive index caused by the second dopant is compensated.

In other words, deviations in the desired refractive index profile of the transmission fibre in radial direction that are caused directly or indirectly, for example due to stresses in the core material, by the second dopant can be effectively compensated through the use of such a third dopant.

Especially when use is made of the Raman effect, the invention provides a transmission fibre in which the second dopant consists of a material which, due to the Raman effect, converts the light of the optical pump energy having a first wavelength into light having a second wavelength that is shifted relative to the first wavelength for the purpose of amplifying the signal beam, wherein the average concentration of the second dopant has been selected so that the amplification factor in the peak of the amplification curve is greater than $1~W^{-1} \cdot km^{-1}$, and wherein the attenuation is less than 0.25 dB/km at a wavelength of 1550 nm when no pump energy is used.

According to the invention, germanium may be used in particular as the first dopant, phosphorous or tellurium may be used in particular as the second dopant and fluorine, boron or a combination of fluorine and boron may be used in particular as the third dopant.

Especially when stimulated emission is used, the invention provides a transmission fibre in which the second dopant consists of a material that has an energy level wherein the electron population is inverted relative to a lower energy level by the light of the pump energy having a first wavelength that is to be supplied, so as to provide an emission of light having a second wavelength different from the first wavelength that is to be stimulated by the signal beam for amplifying the signal beam, wherein the average concentrations of the first, the second and the third dopant have been selected so that the amplification factor at the peak of the amplification curve ranges between 0.001 and 0.01 dB/km and the attenuation is less than 0.25 dB/km at a wavelength of 1550 nm when no pump energy is used.

According to the invention, germanium may be used in particular as the first dopant, erbium may be used in particular as the second dopant and fluorine, boron or a combination of fluorine and boron may be used in particular as the third dopant for amplification by means of stimulated emission.

In another embodiment of the transmission fibre according to the invention, the cladding comprises a cladding layer surrounding the core, with a common interface for the core and the cladding layer, and the material of the cladding layer is doped with a fourth dopant of a material that converts pump energy in the form of light having a first wavelength into light having a second wavelength different from the first wavelength for amplifying an optical signal beam to be transmitted by the transmission fibre.

Losses in the pump energy along the interface can thus be reduced B in an effective manner by suitably selecting the fourth dopant and the variation in the concentration thereof.

In an embodiment of this transmission fibre according to the invention, the concentration of the fourth dopant within the cladding layer increases in radial direction in proportion to the distance to the interface between the core and the cladding layer.

In a preferred embodiment of the invention, the concentration of the fourth dopant within the cladding layer is uniform in tangential direction.

In yet another embodiment of the transmission fibre according to the invention, the second and the fourth dopant consist of the same material, and the concentration of the fourth dopant within the cladding at the location of the interface with the core is identical to the concentration of the second dopant within the core at the location of the interface with the cladding.

In another preferred embodiment of the transmission fibre comprising a cladding according to the invention, the cladding material is doped with a fifth dopant, wherein the material of the fifth dopant and the variation in the concentration of the fifth dopant in the cladding layer have been selected so that the variation in the refractive index in the cladding layer caused by the fourth dopant is compensated.

According to the invention, the fifth dopant may be composed of two or more doping materials.

According to an embodiment of the invention, in particular if use is made of the Raman effect in the core and in the cladding layer, the second and the fourth dopant consist of a material which, due to the Raman effect, converts the light of the optical pump energy having a first wavelength into light having a second wavelength that is shifted relative to the first wavelength for the purpose of amplifying the signal beam, wherein the average concentration of the second and the fourth dopant has been selected so that the amplification factor in the peak of the amplification curve is higher than 1 $W^{-1} \cdot km^{-1}$ and the attenuation is less than 0.25 dB/km at a wavelength of 1550 nm when no pump energy is used.

According to the invention, germanium may be used as the first dopant, phosphorous or tellurium may be used as the second dopant and fourth dopant and fluorine, boron or a combination of fluorine and boron may be used as the third dopant for the transmission fibre comprising the cladding layer, in particular
for amplification by means of the Raman effect.

According to an embodiment of the invention, especially when stimulated emission is used, the second and the fourth dopant consist of a material having an energy level wherein the electron population is inverted relative to a lower energy level by the light of the pump energy having a first wavelength that is to be supplied, so as to realise an emission of light having a second wavelength different from the first wavelength that is to be stimulated by the signal beam for the purpose of amplifying the signal beam, and the average concentrations of the first, the second, the third, the fourth and the fifth dopant have been selected so that the amplification factor at the peak of the amplification curve ranges between 0.001 and 0.01 dB/km and the attenuation is less than 0.25 dB/km at a wavelength of 1550 nm when no pump energy is used.

According to the invention, germanium may be used as the first dopant, erbium may be used as the second and the fourth dopant, and fluorine, boron or a combination of fluorine and boron may be used as the third dopant and the fifth dopant for the transmission fibre comprising the cladding layer, in particular for amplification by means stimulated emission.

The invention also relates to a method for producing a transmission fibre with optical amplification as described in the foregoing, in particular a fibre in which the dopants in a core and a cladding of quartz glass are formed by means of a PCVD ("Plasma Chemical Vapour Deposition") process, in particular with germanium as the first dopant, with phosphorous, tellurium or erbium as the second and/or the fourth dopant, and with fluorine, boron or a combination of fluorine and boron as the third and/or the fifth dopant.

The invention will be explained in more detail hereinafter with reference to the appended drawings.

DETAILED DESCRIPTION OF THE EMBODIMENTS

Figure 1:
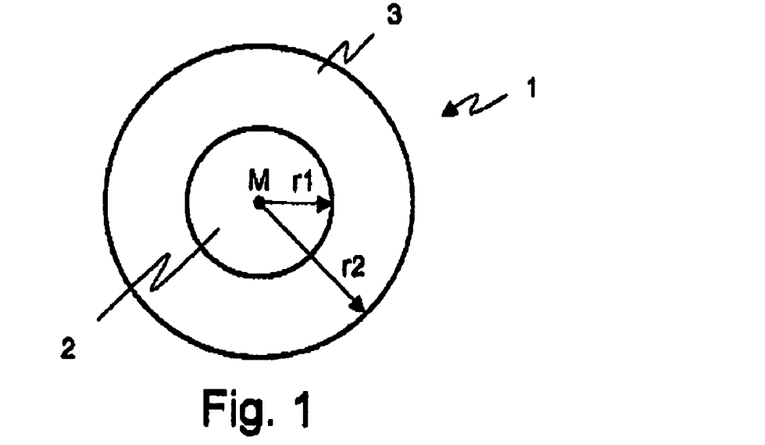
FIG. 1 is a schematic cross-sectional view of a first embodiment of a transmission fibre with optical amplification according to the invention.

FIG. 1 schematically shows in cross-sectional view an embodiment of an optical transmission fibre 1, comprising a core 2 of doped quartz glass (silicon dioxide glass) having a radius r1 and a cladding 3 of undoped quartz glass having a radius r2, which coaxially surrounds the core 2.

The dopants can be introduced by means of a PCVD ("Plasma Chemical Vapour Deposition") process, for example, in which the reactive raw materials are introduced into the quartz glass by means of a plasma. PCVD processes are well-known to those skilled in the art and require no further explanation herein.

By using a plasma for the layered deposition of core material, the material structure that is obtained is such that hardly any "cluster formation" will take place, if at all. The cluster formation, which occurs in other production processes for optical fibres, involves the deposition of a very large number of other molecules of the doped material around a point in the silicon grid in which a molecule of the doped material is present. Such clusters result in a strong increase of, among other things, the signal attenuation with passive use of the transmission fibre.

Usually, germanium (Ge) is used as the dopant for the core 2 for providing the refractive index contrast with the cladding 3 that is required for optical conduction.

In order to realise amplification based on the Raman effect, a second dopant is incorporated in the core upon manufacture of the optical fibre, which second dopant consists of a material that effects an enhanced amplification of a weak transmission signal through the Raman effect in the presence of optical pump energy. Phosphorous or tellurium, among other substances, may be used for amplification based on the Raman effect.

In order to obtain a transmission fibre in which amplification is effected by means of stimulated emission, a second dopant consisting of a material which passes into a so-called "inverted" energy condition in the presence of optical pump energy, is provided in the core 2, which is required for realising stimulated emission and thus amplification. In the case of amplification by means of stimulated emission, erbium, among other substances, may be used as the second dopant.

Figure 2:
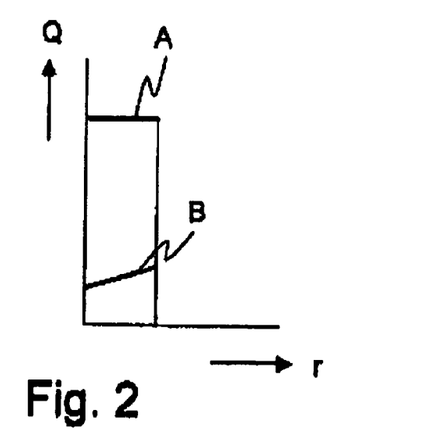
FIG. 2 is a schematic graphic view of the concentration of a first and a second dopant in relation to the distance to the centre of the core for a transmission fibre as shown in FIG. 1.

FIG. 2 schematically shows in graphic form the concentration Q of the dopants in the core 2 in relation to the distance in radial direction r to the centre M of the core 2.

As FIG. 2 shows, the first dopant A, which is used for realising the required refractive index contrast, has a concentration that is uniformly distributed in radial direction over the cross-section of the core 2. According to the invention, the concentration of the second dopant B, which is required for realising the amplification effect in the transmission fibre, increases in radial direction, in such a manner that the highest concentration of the second dopant B is to be found near the interface between the core 2 and the cladding 3. That is, at a distance equal to the radius of the core 2 of the transmission fibre 1.

As a result of the increase in the concentration of the second dopant B, seen in the radial direction of the core 2, the decrease of the pump energy in the radial direction of the core 2 is effectively compensated so as to realise an intended amplification effect of the transmission fibre itself. To achieve that the overall amplification will not depend on the distance in radial direction in the core 2, the concentration of the second dopant B to be realised has to increase in radial direction. The concentrations of the two dopants A and B are uniform in tangential or angular direction.

In the case of passive use of the transmission fibre 1 according to the invention, an optical signal propagating in the core 2 undergoes a negligible or acceptable attenuation as a result of the relatively low concentration of the second dopant B near the centre M of the core 2, because the main portion of the signal beam propagates through the core 2 around the centre M thereof. The higher concentration of the second dopant B at the edge of the core 2 or at the interface between the core 2 and the cladding 3 causes a higher attenuation, to be true, but this only affects a relatively small portion of the overall transmission signal power being transmitted by the transmission fibre 1.

In a preferred embodiment of the transmission fibre 1 according to the invention, the concentration of the second dopant B increases linearly in proportion to the distance to the centre M of the core 2. Depending on, for example, the characteristics of the laser for providing the optical pump energy, the concentration of the second dopant B may also increase curve-wise in the radial direction of the core 2 or, for example, stepwise.

Figure 3:
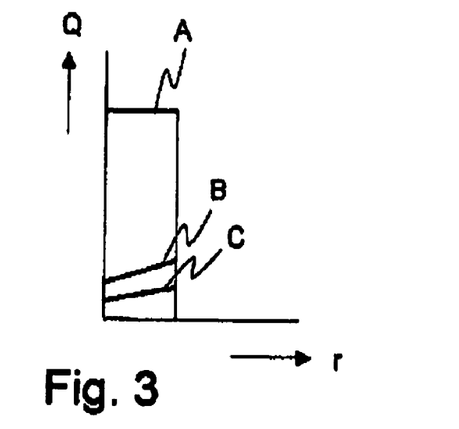
FIG. 3 is a schematic graphic view of the concentration of a first, a second and a third dopant in relation to the distance to the centre of the core for a transmission fibre as shown in FIG. 1.

According to the invention, a third dopant C may be used for compensating the influence of the second dopant B on the refractive index of the core 2, as is graphically illustrated in FIG. 3.

The concentration of the third dopant C is selected such and has a radial variation such that the influence of the second dopant B on the refractive index profile of the core 2 is compensated, all this in such a manner that the end result is a refractive index profile of the transmission fibre that corresponds as much as possible to the refractive index profile as intended with the first dopant A. Fluorine, boron or a combination thereof, may be used as the third dopant, for example. The variation of the concentration of the third dopant C in the core 2 depends on the variation of the concentration of the second dopant B in the core 2 and on the dopants being used, of course.

No specific concentration values Q for the dopants are indicated in FIG. 2 and FIG. 3, because that is not necessary for a correct understanding of the invention. The absolute value of the concentrations of the first, the second and the third dopants, indicated A, B and C, respectively, must be selected so that the correct refractive index contrast associated with the intended type of transmission fibre is obtained. It is also ensured thereby that the Rayleigh scattering caused by the overall concentration of the dopants remains so low that the transmission function of the fibre is retained.

In particular when the transmission fibre is used without optical pump energy, i.e. in the case of passive use of the transmission fibre, the attenuation should hardly increase, if at all, in comparison with the situation in a comparable standard transmission fibre. When optical pump energy having the correct wavelength is used, a sufficient degree of amplification should be obtained.

In the case of amplification based on the Raman effect, the average concentration of the second dopant B has to be selected such that the highest Raman efficiency factor of at least one ($1\ W^{-1} \cdot km^{-1}$) is obtained if the correct optical pump energy is used. This is a factor of 2 to 3 higher than the amplification factor that is obtained with the current standard transmission fibres. For standard single mode fibres, this factor is about 0.3, and for the dispersion shifted fibres this factor is about 0.8.

The Raman efficiency factor is defined as:

$$C_R = g_R / (b \cdot A_{eff})$$

wherein $g_R$=Raman amplification factor;
$A_{eff}$=effective cross-section of the transmission fibre, and
b=polarisation state of the optical signal beam (b=1-2, 1=linear polarisation; 2=non-polarised).

Measurements have shown that the attenuation of the transmission fibre 1 according to the invention doped with first, second and third dopants is 0.25 dB/km or less at a wavelength of 1550 nm, which is not higher than most specifications of cable fibres.

In the case of a transmission fibre 1 in which amplification through stimulated emission in the so-called C-band (wavelength range from 1530 to 1565 nm) and the adjacent L-band (wavelength region from 1565 to 1625 nm) takes place, an amplification of about 0.001 dB/m-0.01 dB/m can be obtained when erbium and an optical pump energy having a wavelength of 1480 nm are used.

Figure 4:
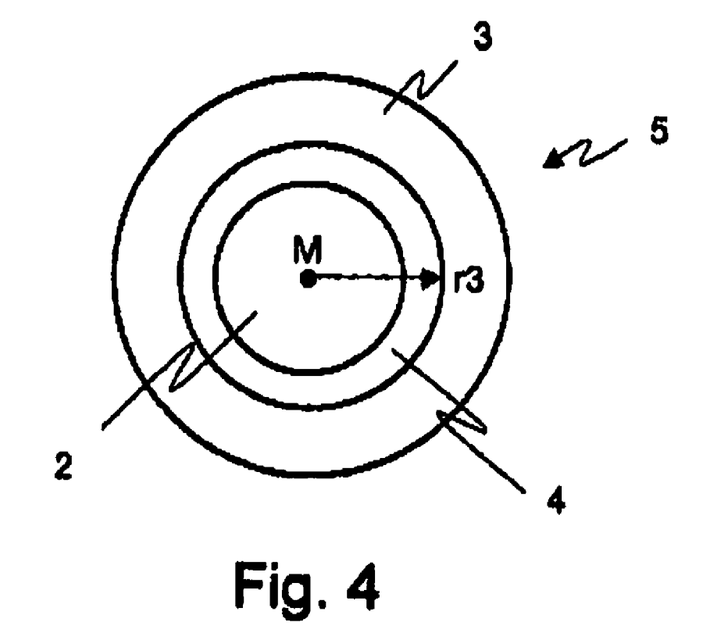
FIG. 4 is a schematic cross-sectional view of a second embodiment of a transmission fibre with optical amplification according to the invention.

FIG. 4 shows another embodiment of an optical transmission fibre 5 according to the invention, in which a doped cladding layer 4 of quartz glass having a radius r3 is present between the core 2 and the cladding 3.

Figure 5:
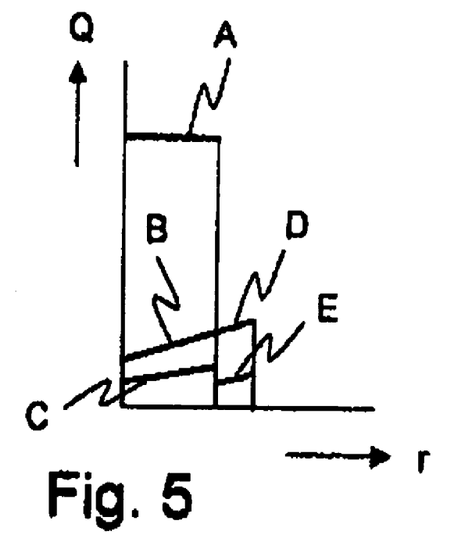
FIG. 5 is a schematic graphic view of the concentration of the dopants in relation to the distance to the centre of the core for a transmission fibre as shown in FIG. 4.

FIG. 5 graphically shows the gradient of the concentration Q of the dopants in the core 2 and the cladding layer 4 in relation to the distance in radial direction r to the centre M of the transmission fibre 5.

As FIG. 5 shows, the cladding layer 4 comprises a fourth dopant D, which has the properties discussed in the foregoing with reference to the second dopant B, and a fifth dopant E, if desired. The first dopant A, for example germanium, is only present in the core 2.

In the embodiment that is shown in FIG. 5, the concentration of the fourth dopant D within the cladding layer 4 increases in radial direction in proportion to the distance to the interface between the core 2 and the cladding layer 4. The concentration of the fourth dopant D within the cladding layer is uniform in tangential direction.

Any amplification loss caused by pump energy propagating in the cladding or optical pump energy propagating near the edge of the core 2, i.e. near the interface between the core 2 and the cladding layer 4, can be reduced by the presence of the fourth dopant D in the cladding layer 4. Changes in the desired refractive index profile of the transmission fibre 5 as a result of the presence of the fourth dopant D can be compensated again by using a fifth dopant E, as explained in the foregoing with reference to the third dopant C.

In the embodiment of the transmission fibre 5 comprising the cladding layer 4 as shown in FIG. 4, it is advisable to prevent possible disruption of the desired refractive index profile at the transition from the core 2 to the cladding layer 4, seen in radial direction, as much as possible. This in order to prevent undesirable disturbances in the signal transmission through the transmission fibre 5.

The type, the concentration and the gradient in radial direction of the fifth dopant E must be selected so that no unnecessary stepwise conditions or the like will occur in the refractive index profile.

It is noted that the dopants or combination of dopants used for the core 2 of the transmission fibre 5 may also be used for the cladding layer 4. Preferably, the same dopant material is used for the fourth dopant D as for the second dopant B, with the same concentrations at the interface between the core 2 and the cladding 4, as schematically illustrated in FIG. 5.

In the case of a transmission fibre 5 with amplification based on the Raman effect, the average concentration of the second dopant B and of the fourth dopant D can again be selected so that the highest Raman efficiency factor of at least one is obtained if the correct optical pump energy is used.

In the case of a transmission fibre 5 with amplification through stimulated emission, the average concentrations of the first, the second, the third, the fourth and the fifth dopant are again preferably selected so that the amplification factor at the peak of the amplification curve ranges from 0.001 to 0.01 dB/km and the attenuation is less than 0.25 dB/km at a wavelength of 1550 nm when no pump 13 energy is used.

FIG. 5 does not indicate any specific concentration values Q for the dopants, either, because this is not necessary for a correct understanding of the invention.

The scope of the invention is defined in the appended claims, and further additions and improvements to the transmission fibre with optical amplification as shown in the figures and described above that are feasible to those skilled in the art are considered to fall within the aforesaid scope. Think in this connection of the use of further dopants, the distributions thereof in the core and the cladding, etc.

The invention claimed is:

1. A transmission fibre with optical amplification, comprising a core and a cladding, wherein the core is doped with a first dopant of a material having a higher index of refraction than the cladding and with a second dopant of a material that converts optical pump energy in the form of light having a first wavelength into light having a second wavelength different from said first wavelength for amplifying an optical signal beam to be transmitted by the transmission fibre, wherein the second dopant consists of a material that has an energy level wherein its electron population is inverted relative to a lower energy level by the light of the optical pump energy having a first wavelength that is to be supplied, so as to provide an emission of light having a second wavelength different from the first wavelength that is to be stimulated by the optical signal beam for amplifying said optical signal beam;

wherein the second dopant has a dopant concentration within the core that increases in radial direction in proportion to a distance to the centre of the core;

wherein the core is doped with a third dopant, and wherein the third dopant and a variation in dopant concentration of the third dopant within the core have been selected such that a variation in the refractive index caused by the second dopant is compensated; and wherein average dopant concentrations of the first, the second and the third dopant have been selected so that amplification at a peak of an amplification curve ranges between 0.001 and 0.01 dB/km and wherein attenuation is less than 0.25 dB/km at a wavelength of 1550 nm when no optical pump energy is used.

2. A transmission fibre according to claim 1, wherein the second dopant has a dopant concentration within the core that is uniform in tangential direction.

3. A transmission fibre according to claim 1, wherein the core is doped with germanium as the first dopant, with erbium as the second dopant, and with one of group comprising fluorine, boron and a combination of fluorine and boron as the third dopant.

4. A transmission fibre according to claim 1, wherein the cladding comprises a cladding layer surrounding the core, with a common interface for the core and the cladding layer, and the cladding layer is doped with a fourth dopant of a material that converts optical pump energy in the form of light having a first wavelength into light having a second wavelength different from said first wavelength for amplifying an optical signal beam to be transmitted by the transmission fibre.

5. A transmission fibre according to claim 4, wherein the fourth dopant has a dopant concentration within the cladding layer which increases in radial direction in proportion to a distance to the interface.

6. A transmission fibre according to claim 4, wherein the fourth dopant has a dopant concentration within the cladding layer which is uniform in tangential direction.

7. A transmission fibre according to claim 4, wherein erbium is used as the fourth dopant.

8. A transmission fibre according to claim 4, wherein the second and the fourth dopant consist of a same material, and the fourth dopant within the cladding at the interface and the second dopant within the core at the interface have equal dopant concentrations.

9. A transmission fibre according to claim 4, wherein the cladding is doped with a fifth dopant, wherein the fifth dopant and a variation in dopant concentration of the fifth dopant in the cladding layer have been selected such that a variation of a refractive index in the cladding layer caused by the fourth dopant is compensated.

10. A transmission fibre according to claim 9, wherein the fifth dopant is composed of at lest two dopant materials.

11. A transmission fibre according to claim 9, wherein fluorine, boron or a combination of fluorine and boron is used as the fifth dopant.

12. A transmission fibre according to claim 9, wherein the second and the fourth dopant consist of a material having an energy level wherein its electron population is inverted relative to a lower energy level by the light of the optical pump energy having a first wavelength that is to be supplied, so as to realize an emission of light having a second wavelength different from the first wavelength that is to be stimulated by the optical signal beam for the purpose of amplifying the optical signal beam, and average dopant concentrations of the first, the second, the third, the fourth and the fifth dopant have been selected so that amplification factor at a peak of an amplification curve ranges between 0.001 and 0.01 dB/km and attenuation is less than 0.25 dB/km at a wavelength of 1550 nm when no optical pump energy is used.

13. A transmission fibre according to claim 12, wherein erbium is used as the fourth dopant, and one of a group comprising fluorine, boron and a combination of fluorine and boron is used as the fifth dopant.

14. A transmission fibre according to claim 4, wherein the second and the fourth dopant consist of a material having an energy level, wherein its electron population is inverted relative to a lower energy level by the light of the optical pump energy having a first wavelength that is to be supplied, so as to realize an emission of light having a second wavelength different from the first wavelength that is to be stimulated by the optical signal beam for the purpose of amplifying the optical signal beam, wherein an average dopant concentration of the second and the fourth dopant has been selected such that an amplification factor at a peak of an amplification curve ranges between 0.001 and 0.01 dB/km and attenuation is less than 0.25 dB/km at a wavelength of 1550 nm when no optical pump energy is used.

15. A transmission fibre with optical amplification, comprising a core and a cladding, wherein the core is doped with a first dopant of a material having a higher index of refraction than the cladding and with a second dopant of a material that converts optical pump energy in the form of light having a first wavelength into light having a second wavelength different from said first wavelength for amplifying an optical signal beam to be transmitted by the transmission fibre, wherein the second dopant consists of a material which, due to the Raman effect, converts the light of the optical pump energy having a first wavelength into light having a second wavelength that is shifted relative to the first wavelength for the purpose of amplifying the optical signal beam, wherein the second dopant has a dopant concentration within the core that increases in radial direction in proportion to a distance to the centre of the core;

wherein the core is doped with a third dopant, and wherein the third dopant and a variation in dopant concentration of the third dopant within the core have been selected such that a variation in the refractive index caused by the second dopant is compensated; and wherein an average dopant concentration of the second dopant has been selected such that amplification in a peak of an amplification curve is greater than $1\ W^{-1} \cdot km^{-1}$, and wherein attenuation is less than 0.25 dB/km at a wavelength of 1550 nm when no optical pump energy is used.

16. A transmission fibre according to claim 15, wherein the core is doped with germanium as the first dopant and with one of a group comprising phosphorous and tellurium as the second dopant.

17. A transmission fibre according to claim 15, wherein the third dopant is composed of at least two dopant materials.

18. A transmission fibre according to claim 15, wherein fluorine, boron or a combination of fluorine and boron is used as the third dopant.

19. A transmission fibre according to claim 15, wherein the cladding comprises a cladding layer surrounding the core, with a common interface for the core and the cladding layer, and the cladding layer is doped with a fourth dopant of a material that converts optical pump energy in the form of light having a first wavelength into light having a second wavelength different from said first wavelength for amplifying an optical signal beam to be transmitted by the transmission fibre.

20. A transmission fibre according to claim 19, wherein the fourth dopant has a dopant concentration within the cladding layer which increases in radial direction in proportion to a distance to the interface.

21. A transmission fibre according to claim 19, wherein one of a group comprising phosphorous and tellurium is used as the fourth dopant.

22. A transmission fibre according to claim 19, wherein the second and the fourth dopant consist of a same material, and the fourth dopant within the cladding at the interface and the second dopant within the core at the interface have equal dopant concentrations.

23. A transmission fibre according to claim 19, wherein the cladding is doped with a fifth dopant, wherein the fifth dopant and a variation in dopant concentration of the fifth dopant in the cladding layer have been selected such that a variation of a refractive index in the cladding layer caused by the fourth dopant is compensated.

24. A transmission fibre according to claim 23, wherein the fifth dopant is composed of at lest two dopant materials.

25. A transmission fibre according to claim 23, wherein fluorine, boron or a combination of fluorine and boron is used as the fifth dopant.

26. A transmission fibre according to claim 23, wherein the second and the fourth dopant consist of a material which, due to the Raman effect, converts the light of the optical pump energy having a first wavelength into light having a second wavelength that is shifted relative to the first wavelength for the purpose of amplifying the optical signal beam, and average dopant concentrations of the first, the second, the third, the fourth and the fifth dopant have been selected so that amplification in a peak of an amplification curve is higher that $1\ W^{-1} \cdot km^{-1}$ and attenuation is less than 0.25 dB/km at a wavelength of 1550 nm when no optical pump energy is used.

27. A transmission fibre according to claim 19, wherein the second and the fourth dopant consist of a material which, due to the Raman effect, converts the light of the optical pump energy having a first wavelength into light having a second wavelength that is shifted relative to the first wavelength for the purpose of amplifying the optical signal beam, wherein an average dopant concentration of the second and the fourth dopant has been selected such that amplification in a peak of an amplification curve is higher than $1\ W^{-1} \cdot km^{-1}$ and attenuation is less than 0.25 dB/km at a wavelength of 1550 nm when no optical pump energy is used.

28. A method for producing a transmission fibre with optical amplification comprising a core and a cladding of quartz glass, wherein the core material is doped with a first dopant of a material having a higher index of refraction than the cladding and with a second dopant of a material that converts optical pump energy in the form of light having a first wavelength into light having a second wavelength different from said first wavelength for amplifying an optical signal beam to be transmitted by the transmission fibre, wherein dopant concentration of the second dopant within the core is provided such that it increases in radial direction in proportion to a distance to a centre of the core;

wherein the core is doped with a third dopant, wherein the third dopant and the variation in dopant concentration of the third dopant within the core are selected such that a variation in the refractive index caused by the second dopant is compensated; and wherein the cladding is provided with a cladding layer surrounding the core, with a common interface for the core and the cladding layer, and in that the cladding layer is doped with a fourth dopant whose dopant concentration within the cladding layer increases in radial direction in proportion to a distance to the interface.

29. A method according to claim 28, wherein the cladding is doped with a fifth dopant, wherein the fifth dopant and a variation in dopant concentration of the fifth dopant in the cladding layer are selected such that a variation in a refractive index in the cladding layer caused by the fourth dopant is compensated.

30. A method according to claim 29, wherein the dopants in a core and a cladding of quartz glass are formed by means of a PCVD ("Plasma Chemical Vapour Deposition") process, in particular with germanium as the first dopant, and erbium as the second dopant, with one of a group comprising fluorine, boron and a combination of fluorine and boron as the third dopant, with one of a group comprising phosphorous, tellurium and erbium as the fourth dopant, and with one of a group comprising fluorine, boron and a combination of fluorine and boron as the fifth dopant.

31. A method according to claim 29, wherein the dopants in a core and a cladding of quartz glass are formed by means of a PCVD ("Plasma Chemical Vapour Deposition") process, in particular with germanium as the first dopant, with one of a group comprising phosphorous and tellurium as the second dopant, with one of a group comprising fluorine, boron and a combination of fluorine and boron as the third dopant, with one of a group comprising phosphorous and tellurium as the fourth dopant, and with one of a group comprising fluorine, boron and a combination of fluorine and boron as the fifth dopant.

32. A method according to claim 28, wherein the dopants in a core and a cladding of quartz glass are formed by means of a PCVD ("Plasma Chemical Vapour Deposition") process, in particular with germanium as the first dopant and erbium as the second dopant.

33. A method according to claim 28, wherein the dopants in a core and a cladding of quartz glass are formed by means of a PCVD ("Plasma Chemical Vapour Deposition") process, in particular with germanium as the first dopant and with one of a group comprising phosphorous and tellurium as the second dopant.

34. A method for producing a transmission fibre with optical amplification, comprising a core and a cladding, wherein the core is doped with a first dopant of a material having a higher index of refraction than the cladding and with a second dopant of a material that converts optical pump energy in the form of light having a first wavelength into light having a second wavelength different from said first wavelength for amplifying an optical signal beam to be transmitted by the transmission fibre, wherein the second dopant consists of a material that has an energy level wherein its electron population is inverted relative to a lower energy level by the light of the optical pump energy having a first wavelength that is to be supplied, so as to provide an emission of light having a second wavelength different from the first wavelength that is to be stimulated by the optical signal beam for amplifying said optical signal beam;

wherein the second dopant has a dopant concentration within the core that increases in radial direction in proportion to a distance to the centre of the core;

wherein the core is doped with a third dopant, and wherein the third dopant and a variation in dopant concentration of the third dopant within the core have been selected such that a variation in the refractive index caused by the second dopant is compensated; and     wherein average dopant concentrations of the first, the second and the third dopant have been selected so that amplification at a peak of an amplification curve ranges between 0.001 and 0.01 dB/km and wherein attenuation is less than 0.25 dB/km at a wavelength of 1550 nm when no optical pump energy is used.

35. A method according to claim 34, wherein the cladding is provided with a cladding layer surrounding the core, with a common interface for the core and the cladding layer, and the cladding layer is doped with a fourth dopant whose dopant concentration within the cladding layer increases in radial direction in proportion to a distance to the interface.

36. A method according to claim 35, wherein the dopants in a core and a cladding of quartz glass are formed by means of a PCVD ("Plasma Chemical Vapour Deposition") process, in particular with germanium as the first dopant and with erbium as the second dopant.

37. A method according to claim 34, wherein the cladding layer is doped with a fifth dopant, and the fifth dopant and a variation in dopant concentration of the fifth dopant in the cladding layer are selected such that a variation in a refractive index in the cladding layer by the fourth dopant is compensated.

38. A method according to claim 37, wherein the dopants in a core and a cladding layer of quartz glass are formed by means of a PCVD ("Plasma Chemical Vapour Deposition") process, in particular with germanium as the first dopant and with erbium as the second dopant, with one of a group comprising fluorine, boron, and a combination of fluorine and boron as the third dopant, with erbium as the fourth dopant, and with one of a group comprising fluorine, boron and a combination of fluorine and boron as the fifth dopant.

39. A method for producing a transmission fibre with optical amplification, comprising a core and a cladding, wherein the core is doped with a first dopant of a material having a higher index of refraction than the cladding and with a second dopant of a material that converts optical pump energy in the form of light having a first wavelength into light having a second wavelength different from said first wavelength for amplifying an optical signal beam to be transmitted by the transmission fibre, wherein the second dopant consists of a material which, due to the Raman effect, converts the light of the optical pump energy having a first wavelength into light having a second wavelength that is shifted relative to the first wavelength for the purpose of amplifying the optical signal beam,     wherein the second dopant has a dopant concentration within the core that increases in radial direction in proportion to a distance to the centre of the core;

wherein the core is doped with a third dopant, and wherein the third dopant and a variation in dopant concentration of the third dopant within the core have been selected such that a variation in the refractive index caused by the second dopant is compensated; and     wherein an average dopant concentration of the second dopant has been selected such that amplification in a peak of an amplification curve is greater than $1\ W^{-1} \cdot km^{-1}$, and wherein attenuation is less than 0.25 dB/km at a wavelength of 1550 nm when no optical pump energy is used.

40. A method according to claim 39, wherein the cladding is provided with a cladding layer surrounding the core, with a common interface for the core and the cladding layer, and the cladding layer is doped with a fourth dopant whose dopant concentration within the cladding layer increases in radial direction in proportion to a distance to the interface.

41. A method according to claim 40, wherein the dopants in a core and a cladding of quartz glass are formed by means of a PCVD ("Plasma Chemical Vapour Deposition") process, in particular with germanium as the first dopant and with one of a group comprising phosphorous and tellurium as the second dopant.

42. A method according to claim 39, wherein the cladding layer is doped with a fifth dopant, and the fifth dopant and a variation in dopant concentration of the fifth dopant in the cladding layer are selected such that a variation in a refractive index in the cladding layer by the fourth dopant is compensated.

43. A method according to claim 42, wherein the dopants in a core and a cladding layer of quartz glass are formed by means of a PCVD ("Plasma Chemical Vapour Deposition") process, in particular with germanium as the first dopant, with one of a group comprising phosphorous and tellurium as the second dopant, with one of a group comprising fluorine, boron and a combination of fluorine and boron as the third dopant, with one of a group comprising phosphorous and tellurium as the fourth dopant, and with one of a group comprising fluorine, boron and a combination of fluorine and boron as the fifth dopant.

\* \* \* \* \*